United States Patent [19]
Harrow et al.

[11] 3,939,813
[45] Feb. 24, 1976

[54] LIQUID FUEL VAPORIZING DEVICE FOR INTERNAL COMBUSTION ENGINES

[75] Inventors: Geoffrey A. Harrow, Wirral; Walter D. Mills, Mold, both of England; John L. Wilson; Ian C. Finlay, both of Glasgow, Scotland

[73] Assignee: Shell Oil Company, Houston, Tex.

[22] Filed: Apr. 15, 1974

[21] Appl. No.: 461,180

[30] Foreign Application Priority Data
Apr. 19, 1973 United Kingdom............... 18888/73

[52] U.S. Cl....... 123/122 A; 123/122 D; 123/122 E
[51] Int. Cl.²......................................... F02M 31/00
[58] Field of Search........ 123/122 E, 122 H, 122 D, 123/122 A; 165/105

[56] References Cited
UNITED STATES PATENTS

| | | | |
|---|---|---|---|
| 2,414,296 | 1/1947 | Gill | 123/122 H |
| 3,625,190 | 12/1971 | Boissevan | 123/122 F |
| 3,763,838 | 10/1973 | Lindsay et al. | 123/122 E |

*Primary Examiner*—Wendell E. Burns
*Assistant Examiner*—R. H. Lazarus
*Attorney, Agent, or Firm*—Ronald R. Reper

[57] ABSTRACT

A liquid fuel vaporizing device for an internal combustion engine wherein a heat pipe containing a heat transfer fluid having a boiling point up to 400°C is disposed so that the heat transfer fluid transfers heat from a heat-receiving zone to a heat discharging zone which heat discharging zone is disposed to vaporize a mixture of said liquid fuel in the main portion or all of the combustion air.

6 Claims, 3 Drawing Figures

LIQUID FUEL VAPORIZING DEVICE FOR INTERNAL COMBUSTION ENGINES

BACKGROUND OF THE INVENTION

The invention relates to a fuel vaporizing device suitable for vaporizing the liquid fuel charge in the inlet system of an internal combustion engine, and to an internal combustion engine which comprises such a device.

The invention also relates to a heat pipe.

The conventional spark-ignition gasoline engine relies on a carburetter to mix a desired proportion of a volatile fuel with the inlet air. For complete combustion of the fuel-air mixture the fuel needs to be uniformly dispersed in the air. Such a uniform mixture is seldom if ever obtained in practice with a conventional carburetter, and manifold fuel injection offers only marginal improvement.

In the fuel-air mixtures obtained with these conventional techniques the fuel is at least partly present in the form of small liquid droplets, and as a film of liquid on the walls of the manifold.

It has been proposed to supply, with the aid of a heat pipe, at a substantially constant temperature sufficient heat to vaporize the entire liquid fuel charge prior to mixing it with the major part of the combustion air, in order to obtain a uniform mixture of fuel and air. Backflowing of evaporated fuel in the air supply ducts, and condensation of the evaporated fuel in the air supply ducts was experienced in a number of cases. This is considered to be a drawback of the said method, because in the said cases no uniform air-fuel mixture will be achieved.

The invention provides a device in which the said drawback has been overcome.

SUMMARY OF THE INVENTION

According to the invention there is provided a fuel vaporizing device suitable for vaporizing the liquid fuel charge in the inlet system of an internal combustion engine prior to its introduction into a combustion chamber of said engine, which comprises one or more heat pipes as herein specified, each of which is in the form of a substantially sealed vessel containing a heat transfer fluid having a boiling point at atmospheric pressure up to 400°C and so constructed that in operation the heat transfer fluid in the liquid phase accepts heat in a heat receiving zone adapted to contact hot exhaust gases of the said engine, and said fluid in the vapor phase condenses and gives up heat in a heat discharging zone adapted to contact said fuel charge to be combusted after the said fuel charge has been mixed with at least the main portion of the combustion air.

The term "heat pipe" as used in this specification is intended to include devices known as "two-phase thermosyphons". This latter term is derived from the presence of both liquid and vapor phases in the device. The geometry of the heat pipe is in no way limited to a circular or tubular configuration. It is of advantage to have available in the heat pipe a provision for the return of condensed heat transfer fluid (e.g., a tube), which enables the said condensed heat transfer fluid to be transported to the bulk of the liquid in the heat pipe, without contacting the rising vapor or the heat transfer fluid.

The use of one or more heat pipes enables heat to be supplied to the fuel within a restricted temperature range virtually regardless of the rate at which the fuel is demanded. Furthermore, at start-up the heat pipe or pipes reach their operating temperature very much more quickly than a solid heat conductor.

The heat transfer fluid present in the heat pipe should preferably have a boiling point at atmospheric pressure of from 60° to 400°C. Heat transfer fluids with a higher boiling point at the pressure operating in the heat pipe may give rise to cracking of the fuel, while heat transfer fluids with lower boiling points are not able to vaporize all the fuel. Heat transfer fluids with a boiling point at atmospheric pressure of from 60 to 300°C are most preferred.

The choice of the heat transfer fluid will depend on the general characteristics of the fuel to be employed and in particular the final boiling point of the latter. The boiling point at the operating pressure of the heat transfer fluid in the heat pipe will in general be higher than the final boiling point of the fuel. In liquid form the heat transfer fluid may be a pure substance or mixture such that the freezing temperature lies between 0°C and 100°C. It is to be chemically stable and non-corrosive to the materials of construction used at the operating temperature of the heat pipe and appreciable chemical decomposition or reaction should not occur within a period of several years when within the heat pipe. Examples of suitable heat transfer fluids are 2-octanol, decane, tetralin, fluids which comprise water such as water itself and mixtures of water and one or more alcohols such as methanol, ethanol, ethylene glycol.

In order to obtain a high heat flux along the heat pipe it is advantageous for the vapor of the heat transfer fluid to be as dense as possible. This tends to imply a high operating pressure in the heat pipe, but in order to avoid a very heavy construction this should be kept below 10 atmospheres under operating conditions.

The construction of the heat pipe must also take into account the maximum and minimum fuel vaporization requirements, so that at no time is all of the heat transfer liquid allowed to vaporize. Alternatively, complete evaporation of the liquid can be utilized to limit the maximum heat flux which can be conveyed.

The heat receiving zone of each heat pipe is arranged to receive heat from the exhaust gases. An auxiliary heat source for the heat transfer fluid in the heat pipe may be provided for use during start-up from cold. Such a heat source very suitably consists of e.g., an electric heater or a self-blowing petrol blowlamp, e.g., heating a tubular boiler in the heat transfer fluid. Very conveniently such an auxiliary heat source is automatically ignited from the ignition switch of the engine, and automatically extinguished when the heat pipe reaches running temperature heated by the exhaust gases. For the automatic operations mentioned conventional electrical circuits may very suitably be used.

As the heat demand from the heat pipe may vary considerably, surplus heat may either be removed by additional cooling means or by regulation of the heat intake. Additional cooling means may e.g., consist of a honeycomb or a multitubular condenser in the upper part of the heat pipe in which additional cooling means e.g., are cooled with the aid of the cooling system of the engine. In case additional cooling means are used very suitably a separate return line for heat transfer fluid condensed by these means to the liquid bulk of that fluid in the heat pipe, without contacting this condensed heat transfer fluid with the heat discharging zone or the rising vapor of the heat transfer fluid is applied. It is also possible to cool the upper part of the heat pipe itself by connecting it to the cooling system of the engine. Air may also be used as additional cooling agent.

In addition to the heat transfer fluid the inclusion of a non-condensable gas in the heat pipe and/or in a separate container in open connection with the heat pipe is also a convenient means for preventing overheating of the heat transfer fluid. In operation, the non-condensable gas will be driven to a relatively cool part of the vessel by the motion of the heat transfer fluid and progressively compressed as the temperature in the heat pipe rises in excess of requirements. The loss of heat from the vapor rising in the heat pipe at the level of the additional cooling means, that preferably are present, will determine the loss of surplus heat and thus prevent overheating.

The quantity of non-condensable gas within the heat pipe and/or in a container in open connection therewith will have a considerable effect on the stable operating temperature of the heat pipe and should thus be carefully controlled in manufacture.

The non-condensable gas, if present, should be gaseous at the operating pressure and chemically non-reactive within the thermosyphon or heat pipe. Examples are air, nitrogen, helium, argon, neon and krypton.

It is of advantage to have a physical separation between the non-condensable gas and the heat transfer fluid. This may be achieved e.g., by the use of a piston or by keeping the non-condensable gas in a closed compressible container, such as bellows made from stainless steel or from a rubber which is resistant to the heat transfer fluid at the prevailing temperature.

In order to remove surplus heat from the heat pipe by additional cooling means, it is also possible to use a piston which is attached with a spring to the upper end of the heat pipe. When the temperature of the heat transfer fluid, and consequently its pressure, increases, the spring is compressed, giving rise to an enlarged contact area between the vapor of the heat transfer fluid and the additional cooling means. In this case a non-condensable gas may or may not be present.

The additional cooling means are provided very conveniently as already mentioned, by part of the cooling system of the engine, in particular by the cooling (in general water-based) liquid of the cooling system. Air may also be used.

As mentioned above overheating of the heat pipe may also be avoided by regulation of the heat intake thereof. This may e.g., be achieved according to the invention in an engine containing an inlet system which comprises a device according to the invention by regulating the amount of exhaust gases which are contacted with the heat receiving zone of the heat pipe. This amount very conveniently may be regulated by a diverter valve in the exhaust system that bypasses part of the exhaust gases. It has been found of advantage to hinge the diverter valve centrally at the point of splitting the exhaust stream. The diverter valve is preferably regulated automatically according to e.g., the pressure in the heat pipe, or the position of the throttle in the inlet system, or the temperature of the exhaust gas. These automatic regulations may be made electrically (e.g., if the pressure in the heat pipe or the temperature of the exhaust gas determines the position of the diverter valve in the exhaust system) or mechanically e.g., by connecting the throttle in the inlet system and the throttle in the exhaust system, or by controlling the diverter valve in the exhaust system in relation to the pressure in the heat pipe with the aid of e.g., a piston or a bellows filled with fluid, which are connected to the heat transfer fluid vapor in the heat pipe and to the said diverter valve. Mixed regulation systems may also be used.

The heat pipe consists of a substantially sealed vessel, which is meant to say that in most cases no air can enter from outside into the heat pipe. If desired a deaeration system may be attached to the heat pipe in case air or no non-condensable gas is present therein, but in general the heat pipe will be absolutely gas-tight and a deaeration system attached to it is superfluous.

The mixing of the fuel and the main portion of the combustion air is very suitably carried out with a (if desired suitably modified) conventional carburetter, or with a fuel injection system.

The method of the present invention, in which the fuel is mixed with the main portion of the combustion air (preferably with all of the combustion air) before being vaporized, results in a more homogeneous air/fuel mixture to be introduced into the cylinders, than a method in which the fuel is evaporated before being mixed with the main portion of the combustion air, because in the latter case no intensive mixing of the gas stream which comprises the vaporized fuel and the air may take place.

A very homogeneous mixture is of advantage because at the leanest possible air-fuel ratio at which the engine can be driven without misfiring, aa homogeneous mixture gives rise to lower amounts of carbon monoxide in the exhaust gas than a less homogeneous mixture. This feature is illustrated in the Example.

An additional advantage of the inlet system according to the invention over a system in which the fuel is vaporized before being mixed with the main portion of the combustion air, is to be found in the fact that no problems occur at acceleration or deceleration. With a system in which the fuel is evaporated separately and before being mixed with the main portion of the combustion air, at acceleration the amount of evaporated fuel which will be mixed with the air will not be optimal because the resistance of the two gas streams is not equal. At first instance at acceleration the vaporized fuel stream will be retarded as compared with the air stream, giving rise to lean mixtures, and accordingly to stalling. Subsequently a richer mixture will be obtained which gives rise to strong acceleration. This feature may occur repeatedly at acceleration, giving rise to unstable running of the engine. The reverse occurs at deceleration, leading to the same type of phenomena.

In case the fuel is evaporated in the presence of the combustion air according to the invention, no unstable running of the engine is experienced.

In the inlet system of an engine according to the invention the fuel is to be vaporized after it has been mixed with at least the main portion of the inlet air. In case the velocity of the air in the inlet system reaches a high value (which is the case if the engine is driven at high speed) the pressure drop downstream of the mixing point of the fuel and air becomes so high, that feeding of the mixture to the engine proper becomes restricted. For that reason it may be convenient that the inlet system contains an air bypass, introducing air at a point downstream of the heat discharging zone of the heat pipe in the inlet system. Very suitably the use of such a bypass is governed by a throttle, which is opened at high speed, e.g., automatically in conjunction with the throttle of the fuel supply e.g., the throttle of the carburetter or another fuel metering device (e.g., at fuel injection).

Another means for compensating for the pressure drop downstream of the heat discharging zone, which may be used without or in addition to a bypass, consists of a compressor (also called supercharger). The use of a compressor has an additional advantage which stems from the following.

In order to keep the amount of noxious compounds in the exhaust gases, which mainly consist of CO, nitrogen oxides ($NO_x$) and hydrocarbons, as low as possible, it is of advantage to run the engine on weak mixtures, or in other words to use an amount of air in excess of the amount needed for total combustion of the fuel to $CO_2$ and $H_2O$. By doing so less power is obtained from the engine as compared when running it with optimum amounts of fuel and air. The power output is increased by the compressor, thus compensating for the said power loss. The compressor may be present in the system downstream of the heat discharging zone but it is preferred that the supercharger compresses the air before it is mixed with the fuel.

As discussed above at cold start special devices can be used to have the heat pipe functioning as soon as possible and thus vaporizing the fuel as soon as possible after starting. Instead of the devices already discussed or in addition to them it may be of advantage to have independent heating means available in the stream which comprises the mixture of the fuel and at least the main portion of the combustion air. These heating means very conveniently consist of an electrically heated surface (e.g., a resistance coil). They preferably are automatically switched on at start, and automatically switched off e.g., when the heat pipe reaches running temperature heated by the exhaust gases. The temperature of these heating means preferably is controlled by an electric circuit to prevent overheating.

In order to minimize the noxious compounds in the exhaust gases at start as far as possible, it may be of advantage to insert in the inlet system of an engine according to the invention a small carburetter, which can only provide sufficient fuel-air mixture to let the engine run idle or at very low speed. This small carburetter is automatically used at start. The exhaust gases from the engine running in the small carburetter heat the heat transfer fluid in the heat pipe, and the main carburetter (or in case fuel injection is used the main fuel supply by injection) automatically starts functioning when the heat pipe reaches running temperature.

It will be clear that each device discussed to be used at cold start may be present alone, but it is also possible that two or more of these devices are present simultaneously in the inlet system of an internal combustion engine according to the invention.

In order to keep the heat pipes as short as possible, it is convenient to locate the part of the inlet system where the fuel and the air are mixed and the part of the inlet system where the fuel is vaporized with the aid of the heat pipe, at the exhaust side of the engine, preferably substantially above the exhaust system. The heated mixture of vaporized fuel and air is very conveniently ducted from there across the engine (e.g., over or alongside the engine) to the point where it is distributed amongst the cylinders of the engine.

It is of advantage, in order to avoid misfiring with the weak fuel-air mixtures that are preferably used, that near the inlet of each cylinder an adjustable valve for bleeding in air is present.

It is preferred that the internal combustion engine is a spark ignition engine.

The use of the device in accordance with the invention enables a gasoline engine to be run on such lean mixtures, in excess of 20:1 air-fuel ratio, that the levels of carbon monoxide and oxides of nitrogen are simultaneously very low.

The capability of burning fuel at ultra lean mixtures also enables fuel having a lower octane number to be used efficiently with the same compression ratio. This has a particularly important implication in that at the present time refining techniques in use cannot produce a lead-free fuel on an economical basis having the same high octane ratings as the leaded premium grades.

The invention will now be further described by way of example with reference to the accompanying drawings.

In all figures the same numbers relate to the same items.

Figure 1:
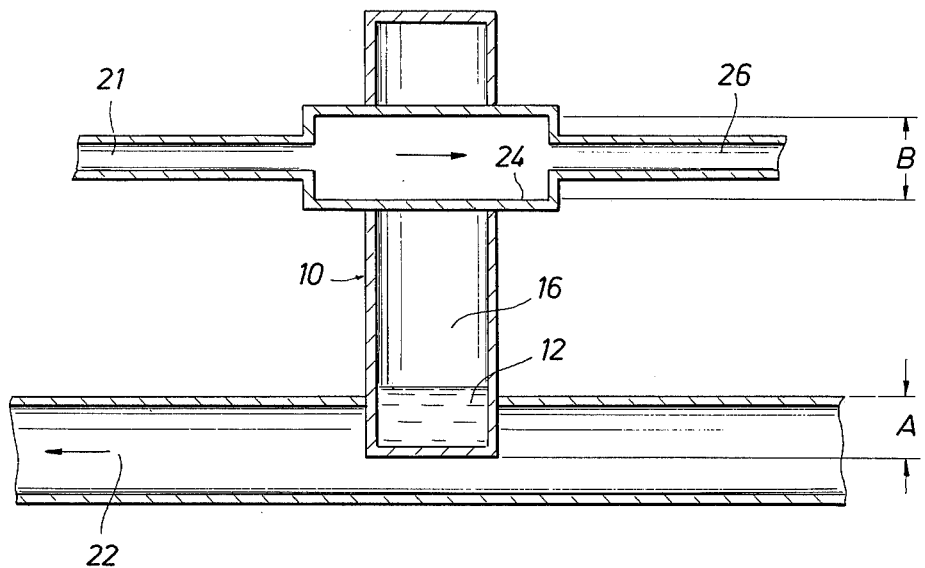
FIG. 1 is a diagrammatic sectional side elevation of a vaporizing device in accordance with the invention.

The fuel vaporizing device to be used as part of an inlet system of a spark ignition engine shown in FIG. 1 comprises a heat pipe 10 whose heat receiving zone A is arranged to receive heat from exhaust gases in an exhaust passage 22. The liquid in the heat pipe is depicted by 12, the vapor by 16. A mixture of fuel and air is supplied via line 21 and the fuel-air mixture is via line 24 disposed in the heat discharging zone B of the heat pipe to receive sufficient heat, at constant temperature, to ensure that all the fuel is vaporized. The mixture so obtained is fed to the engine via line 26.

The necessary fuel metering equipment is not shown but it must be capable of delivering an appropriate quantity of fuel depending on such factors as engine speed and load.

Figure 2:
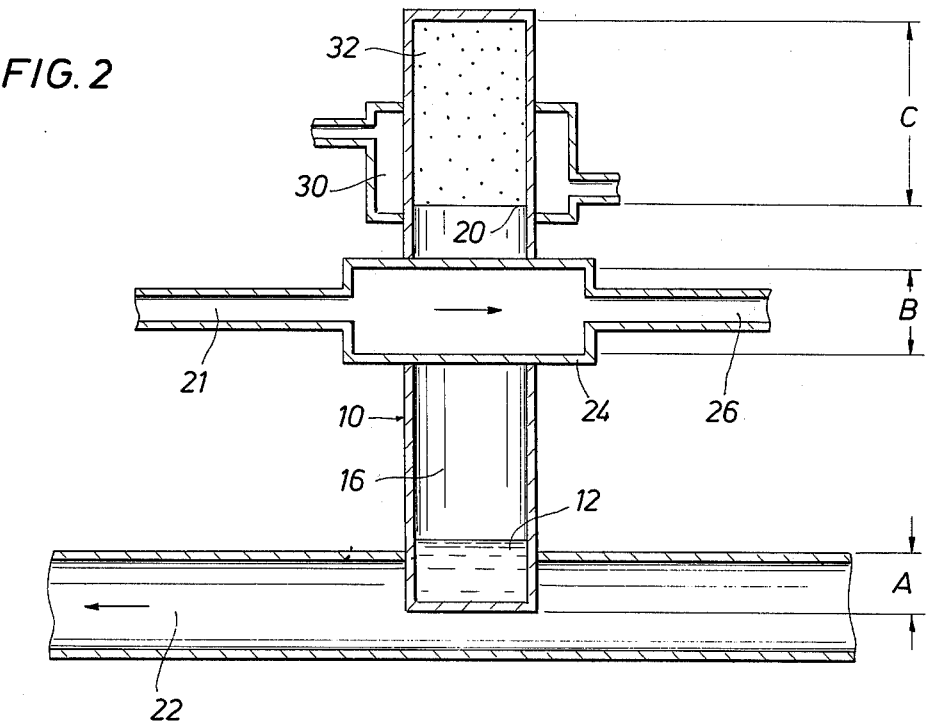
FIG. 2 is similar to FIG. 1 except that the heat pipe additionally contains a quantity of non-condensable gas.

FIG. 2 is similar to FIG. 1, save that the heat pipe 10 has been "temperature stabilized" by the provision of cooling means 30 at its upper end. The vapor 16 of the heat transfer fluid is normally kept out of contact with this part of the heat pipe by a small quantity of non-condensable gas 32. The interface between the non-condensable gas and the vapor of the heat transfer liquid is depicted by 20.

Figure 3:
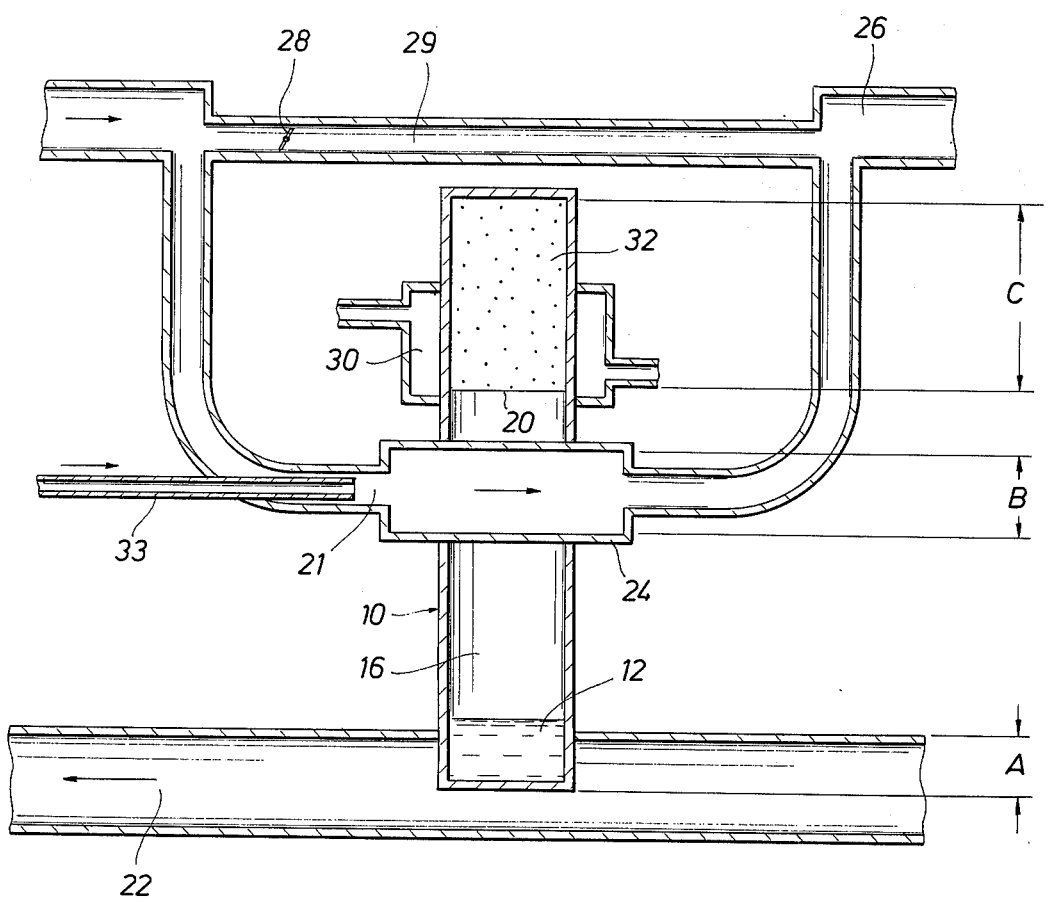
FIG. 3 shows diagrammatically an alternative embodiment of the invention.

FIG. 3 differs from FIG. 2 only in that the fuel in the presence of the main portion of combustion air is vaporized in the heat discharging zone B. A small quantity of air may be bled from the main stream of combustion air through a bypass passage 29. The bypass stream may be regulated with the aid of the butterfly valve 28 which may be governed automatically by the throttle of the fuel supply. Fuel is mixed in with the main stream of air via device 33, which may e.g., be a carburetter or a fuel injection device.

EXAMPLE

In order to illustrate the influence of the homogeneity of a fuel/air mixture on the amounts of carbon monoxide in the exhaust gas the 1970 Federal Test Procedure was carried out in a Triumph Herald 1500 cc car. This test is a seven-mode cycle test which is repeated seven times; the total duration of the test is 959 seconds. The measurements obtained during the first four cycles are considered to be the cold results and those during the sixth and seventh cycle are the hot results. A weighting procedure is used to obtain the total cycle emissions on a mass basis. The test procedure is fully described in Federal Register, Vol. 33, No. 8, Pt. II, June 4 1968.

The test cycles were driven at the leanest possible air-fuel ratio carburetter setting (or mixture generator composition). At settings leaner than this limiting condition the car would not follow the acceleration modes of the test cycle.

The tests were carried out with LPG vapour-air mixtures which were prepared in two ways viz. with a Mixture Generator (as described in SAE paper No. 710588, "The influence of homogeneous charge on the exhaust emission of hydrocarbons, carbon monoxide and nitrogen oxide from a multicylinder engine" by R. Lindsay et al.) leading to a very homogeneous fuel/air mixture, and with a Lipton L.P. gas carburetter giving a less homogeneous air/fuel mixture.

The results are presented in the table. As can be seen the emission of carbon monoxide is lower when a mixture generator is used (which gives rise to a very homogeneous air/fuel mixture) than when a carburetter is used.

The evaporation of an air/fuel mixture obtained with the device according to the invention leads to a more homogeneous mixture of fuel and air than can be obtained with a device in which fuel is evaporated and subsequently mixed with combustion air, and use of the former device will accordingly give rise to a more favourable composition of the exhaust gases of the engine.

Table

| Exhaust emissions in the 1970 US Federal Test Procedure | | | |
|---|---|---|---|
| Exhaust component | Emission on a concentration basis, p.p.m. vol. or % vol. | | Total mass emissions, g/mile |
| | "Cold" cycles | "Hot" cycles | |
| LPG from carburetter | CO  0.45% | 0.7% | 16.1 |
| LPG from mixture generator | CO  0.03% | 0.09% | 1.73 |

What we claim is:

1. In a device for vaporizing the liquid fuel charge in the inlet system of an internal combustion engine prior to its introduction into a combustion chamber of said engine, said inlet system including combustion air supply means which comprises a main air supply duct to supply the main portion of the combustion air, and liquid fuel supply means disposed to supply liquid fuel to said main air supply duct; said device comprising
at least one heat pipe, said heat pipe being in the form of a substantially sealed vessel;
said heat pipe containing a heat transfer fluid having a boiling point at atmospheric pressure up to 400°C;
said heat pipe being disposed so that a liquid phase of the heat transfer fluid accepts heat in a heat-recovery zone adapted to contact hot exhaust gases from said engine, and a vapor phase of the fluid being disposed to condense in a heat-discharging zone, the improvement comprising that said heat discharging zone is disposed in heat transfer relationship with said main air supply duct to heat said liquid fuel charge which has been mixed with at least the main portion of the combustion air.

2. A device as claimed in claim 1, in which the heat transfer fluid present in the heat pipe has a boiling point at atmospheric pressure of from 60° to 300°C.

3. A device as claimed in claim 1, in which the heat transfer fluid comprises water.

4. A device as claimed in claim 1, in which the heat pipe contains additional cooling means in the upper part of the heat pipe which are cooled with the aid of the cooling system of the engine.

5. A device as claimed in claim 1, in which the heat pipe contains a non-condensable gas.

6. A device as claimed in claim 5, in which a physical separation is present between the non-condensable gas and the heat transfer fluid.

* * * * *